(12) United States Patent
Blottiau

(10) Patent No.: US 9,840,207 B2
(45) Date of Patent: Dec. 12, 2017

(54) PROFILE SECTION MOLDED BY MULTI-INJECTION MOLDING AND FORMING A SEAL OR A MOLDING FOR THE BODY OF A MOTOR VEHICLE, AND METHOD FOR MANUFACTURING SAME

(75) Inventor: Olivier Blottiau, Cepoy (FR)

(73) Assignee: Hutchinson, Paris (FR)

( * ) Notice: Subject to any disclaimer, the term of this patent is extended or adjusted under 35 U.S.C. 154(b) by 376 days.

(21) Appl. No.: 14/116,621

(22) PCT Filed: May 2, 2012

(86) PCT No.: PCT/IB2012/052187
§ 371 (c)(1),
(2), (4) Date: Dec. 11, 2013

(87) PCT Pub. No.: WO2012/153234
PCT Pub. Date: Nov. 15, 2012

(65) Prior Publication Data
US 2014/0212621 A1    Jul. 31, 2014

(30) Foreign Application Priority Data

May 10, 2011    (FR) ...................................... 11 53993

(51) Int. Cl.
*B32B 3/06*    (2006.01)
*B60R 13/02*    (2006.01)
(Continued)

(52) U.S. Cl.
CPC ...... *B60R 13/0206* (2013.01); *B29C 45/0003* (2013.01); *B29C 45/162* (2013.01);
(Continued)

(58) Field of Classification Search
CPC .............. B29C 45/0003; B29C 45/162; B29C 45/1671; B29C 45/1676; B29C 45/1679;
(Continued)

(56) References Cited

U.S. PATENT DOCUMENTS 4,833,847 A * 5/1989 Inayama .................. B60J 10/70
296/201
4,973,212 A * 11/1990 Jacobs .................. F16B 5/0642
24/297

(Continued)

FOREIGN PATENT DOCUMENTS

EP    2 121 303 A1    11/2009
FR    2 825 945 A1    12/2002
(Continued)

OTHER PUBLICATIONS

FR 2901187 A1 Machine Translation.*
(Continued)

*Primary Examiner* — Maria Veronica Ewald
*Assistant Examiner* — Travis Figg
(74) *Attorney, Agent, or Firm* — Alston & Bird LLP

(57) ABSTRACT

The present invention relates to a profile section molded by the multi-injection molding of thermoplastic materials having different hardnesses, and forming a seal or a molding for the body of a motor vehicle, as well as to a method for manufacturing said profile section. Said profile section (10") includes at least: an antifriction coating (13") tightly bonded to a longitudinal sealing surface (12a") of the profile section and intended enabling the latter to sealingly contact a mobile element of the vehicle, said sealing surface ending, substantially at a right angle at the respective ends thereof, in two transverse sealing edge surfaces of the profile section; and/or a decorative film (14") tightly bonded to a visible longitudinal surface (11c") of the profile section and intended for enhancing the appearance of said surface, wherein said visible longitudinal surface is separate from the sealing surface and ends, substantially at a right angle at the respective ends thereof, in two visible transverse edge surfaces of the profile section, characterized in that said materials are overmolded: (i) either on said coating(s) or on (Continued)

said film(s), which is/are tightly bonded, in a continuous manner, to at least one of the visible edge surfaces; (ii) or on said coating(s) and on said film(s), which are optionally tightly bonded, in a continuous manner, to at least one of the sealing edge surfaces and to at least one of the visible edge surfaces.

12 Claims, 7 Drawing Sheets

(51) Int. Cl.
| | |
|---|---|
| B29C 45/16 | (2006.01) |
| B29C 45/00 | (2006.01) |
| B60R 13/06 | (2006.01) |
| B60J 10/16 | (2016.01) |
| B60J 10/17 | (2016.01) |
| B60J 10/265 | (2016.01) |
| B60J 10/75 | (2016.01) |

(52) U.S. Cl.
CPC ...... *B29C 45/1671* (2013.01); *B29C 45/1676* (2013.01); *B29C 45/1679* (2013.01); *B60J 10/16* (2016.02); *B60J 10/17* (2016.02); *B60J 10/265* (2016.02); *B60J 10/75* (2016.02); *B60R 13/06* (2013.01); *Y10T 428/24008* (2015.01); *Y10T 428/24983* (2015.01)

(58) Field of Classification Search
CPC . B60J 10/16; B60J 10/17; B60J 10/265; B60J 10/75; B60R 13/0206; B60R 13/06; Y10T 428/24008; Y10T 428/24983
See application file for complete search history.

(56) References Cited

U.S. PATENT DOCUMENTS

| | | | | |
|---|---|---|---|---|
| 5,475,947 A * | 12/1995 | Dupuy | ............... | B60R 13/04 49/440 |
| 5,743,047 A * | 4/1998 | Bonne | ............... | B60J 10/00 49/441 |
| 5,913,762 A * | 6/1999 | Matsumoto | ............... | B60J 10/16 49/377 |
| 6,103,168 A * | 8/2000 | Kelly | ............... | B29C 45/14336 156/245 |
| 6,409,256 B1 * | 6/2002 | Page | ............... | B60R 13/04 296/203.01 |
| 6,416,113 B1 * | 7/2002 | Page | ............... | B60J 5/0402 296/146.1 |
| 6,422,571 B1 * | 7/2002 | Keeney | ............... | F16J 15/025 277/590 |
| 6,446,392 B1 * | 9/2002 | Maki | ............... | B60J 10/265 49/377 |
| 6,740,390 B2 * | 5/2004 | Randazzo | ............... | B29C 45/1676 428/122 |
| 6,786,007 B2 * | 9/2004 | Aritake | ............... | B29C 45/14409 264/250 |
| 6,932,416 B2 * | 8/2005 | Clauson | ............... | B60R 13/0206 296/146.7 |
| 6,966,601 B2 * | 11/2005 | Matsumoto | ............... | B60R 13/0206 296/146.2 |
| 7,614,836 B2 * | 11/2009 | Mohiuddin | ............... | B60R 13/0206 411/508 |
| 2001/0001916 A1 * | 5/2001 | Nozaki | ............... | B60J 10/16 49/414 |
| 2001/0055663 A1 * | 12/2001 | Mertzel | ............... | B32B 25/08 428/122 |
| 2002/0152686 A1 * | 10/2002 | Whitehead | ............... | E05D 15/0608 49/127 |
| 2003/0017302 A1 * | 1/2003 | Drozd | ............... | B32B 15/08 428/122 |
| 2005/0095374 A1 * | 5/2005 | Cothran | ............... | B29C 47/0004 428/31 |
| 2005/0095397 A1 * | 5/2005 | Omori | ............... | B32B 27/08 428/122 |
| 2007/0298254 A1 | 12/2007 | Cretin | | |
| 2008/0302022 A1 * | 12/2008 | Knight | ............... | B60J 10/235 49/490.1 |
| 2009/0265999 A1 * | 10/2009 | Stefanelli | ............... | B29C 45/1676 49/490.1 |
| 2012/0110916 A1 * | 5/2012 | Gopalan | ............... | B29C 47/0021 49/475.1 |
| 2013/0055644 A1 * | 3/2013 | Baratin | ............... | B60J 10/18 49/490.1 |
| 2014/0212621 A1 * | 7/2014 | Blottiau | ............... | B29C 45/162 428/99 |

FOREIGN PATENT DOCUMENTS

| | | | | |
|---|---|---|---|---|
| FR | | 2825945 A1 * | 12/2002 | ........ B29C 45/14778 |
| FR | | 2 897 564 A1 | 8/2007 | |
| FR | | 2 901 187 A1 | 11/2007 | |
| FR | | 2901187 A1 * | 11/2007 | ........ B29C 45/1676 |
| WO | WO 2008/087672 A1 | | 7/2008 | |

OTHER PUBLICATIONS

Definition of intimate.*
International Search Report and Written Opinion or Application No. PCT/IB2012/052187 dated Jun. 28, 2012.

\* cited by examiner

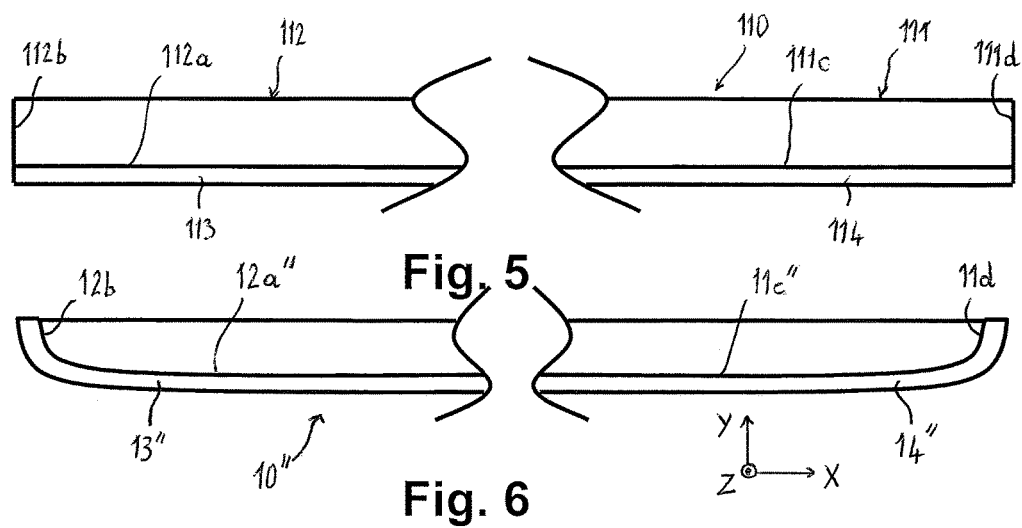
Fig. 5
Fig. 6
Fig. 7                                    Fig. 8

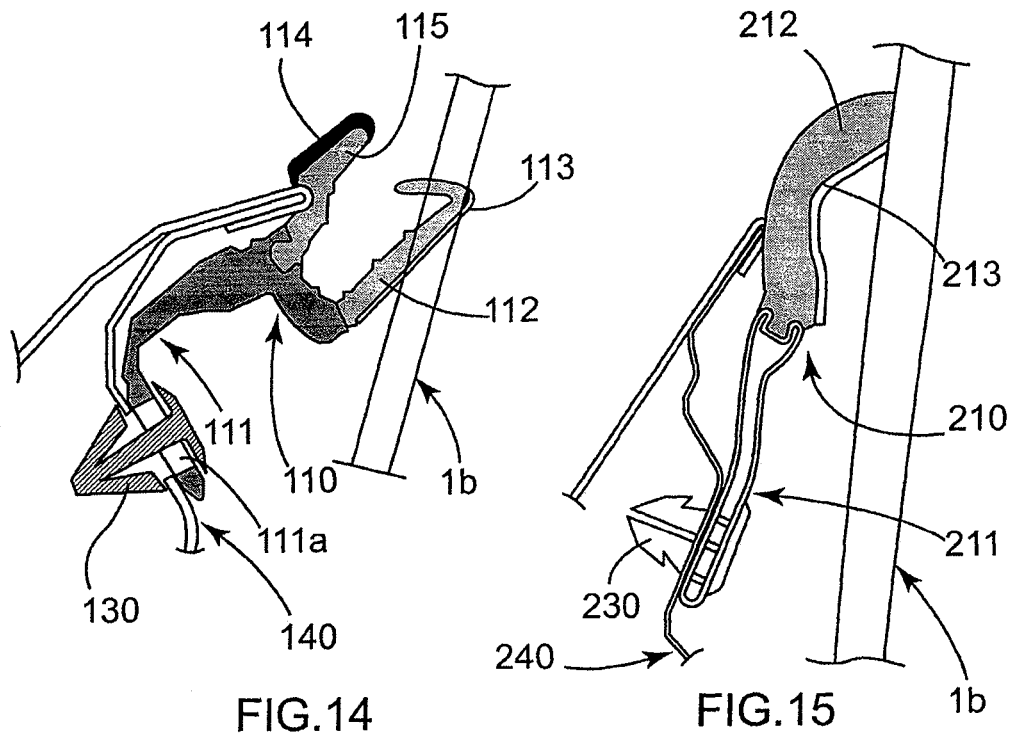
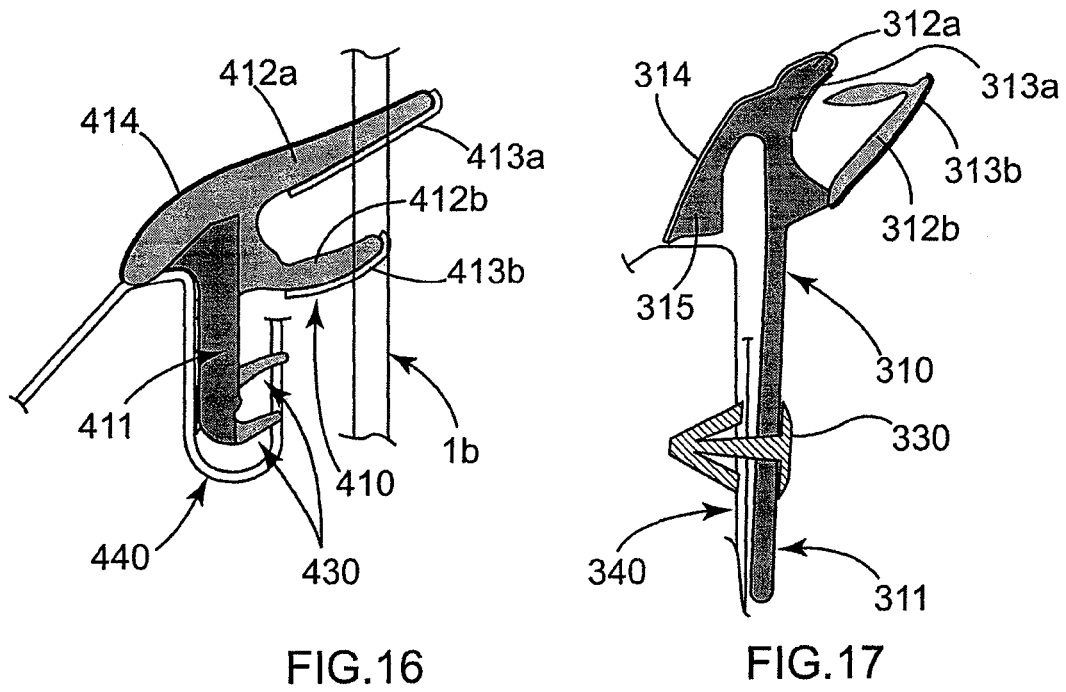

PROFILE SECTION MOLDED BY MULTI-INJECTION MOLDING AND FORMING A SEAL OR A MOLDING FOR THE BODY OF A MOTOR VEHICLE, AND METHOD FOR MANUFACTURING SAME

FIELD

The present invention relates to a profile section molded by multi-shot injection molding of thermoplastic materials of different hardnesses forming a seal or trim molding for automotive vehicle bodywork having one or more antifriction surfaces and/or surfaces of heightened appearance, and to a method of manufacturing this profile section. The invention applies to all seals that can be used on such vehicles, notably those chosen from inner and outer wiping gaskets, glass run channels, double seals, and also all trim moldings with which these vehicles are fitted, for example trim moldings for door frames, for wiping gaskets, for glass run channels or for fixed light moldings (e.g. rear quarter-light or back glass trim moldings or even windshield or rear screen trim moldings).

BACKGROUND

An automotive bodywork seal generally has the following functions:
- that of being retained on its support, which is made up of a bodywork element, this retention function generally being afforded by a rigid part made of a U-section clamp or of a base that is flat overall having openings for the passage of intermediate clips or cramps for fixing to the support;
- that of providing, via a "slippery" surface, sealed contact between this support and a fixed light or drop glass or some other part of the bodywork (for example between a door panel and a sliding window in the case of an inner or outer wiping gasket or between a door frame and a side of the bodyshell in the case of a "frame" seal), this sealed contact generally being achieved by a zone of flexible material on which there is an antifriction covering very often consisting of flock; and
- that of having, on its or each of its visible face(s) an embellishment covering with a surface that is pleasing to the eye and in harmony with the surrounding components and is also durable, not losing its pleasing appearance with the passage of time.

This antifriction covering is currently the result either of an "online" application of adhesive followed by flocking (generally made of polyamide or polyethersulfone), or the laminating-on of a flocked strip, these two methods being able to be performed:
- in the case of extruded seals, online during the extrusion process, or
- in the case of molded seals, afterwards during an additional operation that follows a multi-shot injection molding of each seal.

As far as the embellishment covering is concerned this may be obtained either in the form of a film by laminating it onto an extruded seal or by painting, for example, or by adding an add-on trim molding in order to give the seal the desired appearance.

One major disadvantage with applying these coverings or laminating them onto the profile sections, both online and as an additional operation afterwards, lies in the general need to activate the support beforehand in order to make the adhesive or the strip stick. In addition, it is often found that the post-production cutting operation using punch and die that is generally performed to finish the extruded strip, in addition to carrying an additional cost, may cause the strip to begin to detach, this detachment being worsened by the fairly intensive daily use made of the seal once it is mounted on the vehicle (e.g. sliding, vibration, hand contact in particular).

Another disadvantage inherent to the in-line application methods is that the extrusion that has to be used in such cases does not allow the creation of a component of non-constant section nor does it allow the "hidden" (i.e. inaccessible) zones of a profile section to be treated with antifriction surfaces or surfaces of heightened appearance, and in addition does not allow the simultaneous treatment on the one hand of the longitudinal face of the profile section that is to be provided with an antifriction covering or the one that is to be provided with an embellishment film and, on the other hand, the rounded or angular end edge faces of this profile section.

As for the existing two-shot injection molding methods, these have the disadvantage of it not being possible to plan for simultaneous use of several strips or films, or for the covering of the end edge faces of the profile sections. The problem is that the inserts hitherto applied to the bottom of the two-shot injection molds cover only the relevant (near-planar or curved) longitudinal face of the profile section, carrying the following major risks in the case of the antifriction covering or embellishment covering that this inset provides, which may prove to be:
- either too short, leaving part of the fair face the appearance of which was to be heightened by the insert visible, or alternatively leaving uncovered a functional part which, in the case of an antifriction covering, will have too high a coefficient of friction and will cause the treated zone to malfunction, for example by causing the lip of the weatherstrip to curl over, or by causing the glass that is supposed to slide in it to judder, etc.;
- or too long, with the insert forming added thickness or folding over and causing incorrect operation of the functional part that it covers or difficulties with assembly (e.g. clogging) or alternatively protruding unattractively beyond the ends of the profile section, necessitating an additional trimming operation afterwards.

SUMMARY

It is one object of the present invention to propose a profile section molded by multi-shot injection molding of thermoplastic materials of different hardnesses forming a seal or trim molding for automotive vehicle bodywork the profile section making it possible to overcome all of the aforementioned disadvantages and comprising at least:
- an antifriction covering intimately bonded to a longitudinal sealing face of the profile section and intended to provide sealed contact with a mobile element of the vehicle, this sealing face terminating substantially at right angles at its respective ends in two sealing transverse edge faces of the profile section, and/or
- an embellishing film intimately bonded to a visible longitudinal face of the profile section mounted on the vehicle and intended to heighten the appearance of this visible face, which face is distinct from said sealing face and terminates substantially at right angles at its respective ends in two visible transverse edge faces of the profile section.

To this end, a profile section according to the invention is such that these materials are overmolded:

(i) either on said at least one covering or on said at least one film, which covering/s or which film/s is/are also intimately bonded continuously by this overmolding to at least one of said sealing edge faces or to at least one of said visible edge faces, respectively, (ii) or both to said at least one covering and to said at least one film, which covering/s and which film/s are optionally also intimately bonded continuously by this overmolding to at least one of said sealing edge faces and to at least one of said visible edge faces, respectively.

It will be noted that, by definition, this multi-shot injection molded profile section according to the invention has a visibly recognizable parting line inherent to the molding process and that, as will be explained in detail hereinafter, the term multi-shot injection molding means, in the known way, sequential injections of several materials into one and the same mold, i.e. essentially the following successive steps in the special case of two-shot injection molding:

the injection of a first material into a first cavity of the mold, the opening of the mold, the rotating of a moving part of the mold bearing this first injected material, the closing of the mold with a second part comprising a second cavity that complements the first, followed by the injection of a second material into the second cavity.

For a detailed description of a mold that can be used for performing multi-shot injection molding reference may, for example, be made to document FR-A1-2 897 564 in the name of the Applicant Company.

It will also be noted that:

according to scenario (i) and optionally to scenario (ii), this profile section of the invention is such said covering/s or said film/s cover said at least one end transverse edge face of the profile section without intermediate adhesive because the intimate bonding between this/these covering/s or this/these film/s and the profile section is the result of the overmolding alone, to the exclusion of any added fixing in particular, and that according to scenario (ii), which plans for the joint obtaining by multi-shot injection molding of the antifriction covering/s and of the embellishment film/s independently of this optional covering of the corresponding edge faces, this profile section of the invention overcomes the aforementioned disadvantage of the two-shot injection molding methods of the prior art which is that of not allowing simultaneous covering of a sealing face and of a visible face of the profile section with such a covering and with such a film, respectively.

Further, this covering according to the invention of the end edge faces of the profile section with said antifriction covering/s and/or with said embellishment film/s, in addition to covering the relevant (quasi-planar or otherwise) longitudinal face of the profile section, makes it possible to ensure sliding contact and/or a perfect appearance even on the ends of the profile section, giving it:

in the case of a seal, such as an inner or outer wiping gasket: better sealing thanks to the antifriction covering that covers the sealing face of the seal (a "compressible" zone on the edge face of the wiping lip of the seal against the vertical part of the glass run channel) and/or in the case of such a seal or of a trim molding: a perfect appearance of the ends of the embellishment film because there is no risk of catching a glimpse of the edge faces thereof, it being emphasized that detachment of this film in the loaded regions is advantageously excluded thereby.

It will further be noted that the "turnover" of the antifriction covering onto the end edge faces of the profile section (i.e. onto the edge faces of the sealing lip of the seal) also makes it possible to mask any spread of seal length which could result in a lack of "slipperiness" and absence of contact with the vertical parts of the glass run channel, something which in use on the vehicle causes problems.

Moreover, it should be noted that this covering of said at least one edge face of the profile section with this/these covering/s and/or this/these film/s differs in particular from the coverings obtained in the above-mentioned prior art using overmolding of two-shot injection-molded materials onto an insert, in that:

each covering and/or film obtained according to the invention is neither too short nor too long and therefore leaves no visible part of the sealing face and/or visible face of the profile section uncovered and does not extend beyond the edge face/s that it covers thus avoiding any subsequent trimming, any problem of excess thickness, or any problem of curling over in use, and in that this profile section of the invention may have both this antifriction covering and this embellishment film respectively on its sealing face and on its visible face, unlike the known two-shot injection molded profile sections in which only one single covering or film was bonded to the injected materials.

According to another feature of the invention, said at least one covering and/or film has/have, when viewed in longitudinal section in a plane of section substantially perpendicular to said sealing face and/or to said visible face, respectively, a flat or curved median portion that hugs the contour of this face and extends continuously for example via a rounded portion at least at one of said edge faces so that this/these covering/s and/or this/these film/s substantially has/have in this plane of section preferably the shape of a " ⌠ " at said or each edge face that it/they covers/cover.

Advantageously, said at least one covering and/or said at least one film may have substantially this "⌠" shape at least at one of said two edge faces, the or each edge face then being able to be flared slightly with respect to a right angle into an obtuse angle, for example of between 90 and 120° or, as an alternative, at an angle of less than 90°. The latter scenario relating to an acute angle for the covering of the or each sealing and/or visible edge face relates notably to embellishment films which in certain instances need to conform to constraints of style and the particular kinematics of the opening panels.

According to one preferred embodiment of the invention, this profile section specifically forms a seal, comprising a fixing portion made completely or in part from at least one rigid material which is intended to be mounted on a support of the vehicle and which has said visible face, and a sealing portion made from at least one flexible material and which is connected to the fixing portion and has said sealing face, the profile section comprising said covering/s of flock type on said sealing portion and/or said film/s for example of glossy or chromed type on said fixing portion.

According to this preferred embodiment of the invention, this profile section may advantageously comprise both said covering/s and said film/s respectively on said sealing and visible faces which define dorsal faces of sealing and fixing portions and which are for example situated on opposite sides from one another in the transverse direction of the profile section.

As explained hereinabove, the joint formation of the antifriction covering/s and of the embellishment film/s on the seal via this multi-shot injection overmolding has never been obtained in the prior art, so far as the Applicant is aware, and constitutes a preferred embodiment of the invention.

In this case, this/these covering/s and this/these film/s may both cover said at least one flexible material respectively on the sealing portion and on the fixing portion, the latter comprising firstly said at least one rigid material which is not provided with the film/s and secondly a partial coating of this rigid material made with said at least one flexible material which defines said visible face covered by this/these film/s.

As an alternative, this/these covering/s may cover said at least one flexible material over the sealing portion and this/these film/s may cover said at least one rigid material over the fixing portion, the latter comprising said at least one rigid material intended to be mounted in contact with said support and, optionally also, at least one lip made from said at least one flexible material which extends said visible face and which is not provided with this/these film/s.

According to another feature of the invention that is common to all of the above-mentioned features, said fixing portion may for example be configured to form a clamping core that clamps onto said support. As an alternative, the fixing portion may be configured to be mounted by clipping on to the support via a plurality of pins or clips which in a spaced-apart manner pass through this fixing portion and are intended to pass through an orifice in this support. In another alternative form, said fixing portion may terminate in a leg provided with spikes after the manner of the barbed end of a hook, so that it can catch in a U-section portion of the support.

According to one example of how this preferred embodiment of the invention common to the examples and to the alternative form mentioned hereinabove can be achieved, this profile section forms, by way of a seal, an inner or outer wiping gasket for a vehicle drop glass, in which said fixing portion may be made from said at least one rigid material and said sealing portion may comprise at least one sealing lip connected to said fixing portion (in the particular case in which the latter, in the manner of a clamp, forms a core for clamping onto the support, this sealing lip may be connected to a branch of said fixing portion making substantially a V-shape in transverse section).

In general and with reference to all the aforementioned features of the present invention, it will be noted that said at least one rigid material may consist of any thermoplastic polymer (TP) that can be used to form the fixing portion of a seal or of a trim molding on a motor vehicle. Advantageously, this/these thermoplastic polymer/s may be chosen from the group consisting of polypropylenes, polyamides, polyvinylchlorides (PVC), polymethylmethacrylates (PMMA), acrylonitrile-butadiene-styrene (ABS) terpolymers and mixtures thereof and is preferably a polypropylene reinforced with a filler chosen for example from the group consisting of talc, hemp, wood, cork, glass fibers and mixtures thereof (the purpose of this filler being to increase the rigidity of the basic material). It will be noted that other thermoplastic polymers can be used and that the choice of these polymers is notably the result of a compromise between the cost and the rigidity of the materials in question.

Likewise in general, it will be noted that said at least one flexible material may advantageously consist of a thermoplastic elastomer (TPE) with a hardness or rigidity that is lower than that of this/these rigid material/s, such as a thermoplastic styrene (TPS, e.g. an SEBS) or a thermoplastic vulcanizate (TPV, e.g. "Santoprene" or "Vegaprene").

By way of antifriction covering/s that can be used in the seals of the invention, mention may for example be made of multilayer flocked strips such as those marketed by the company Dimontonate Floccati and described in patent EP-B1-2 121 303, i.e. those comprising at least one thermosetting adhesive layer, for example based on an ethylene/propylene copolymer, a first adhesive layer for example based on a graft polypropylene, a layer of thermoplastic polycondensation polymer, a second adhesive layer for example based on a polyurethane and a flock, for example based on a polyester or a polyamide. However, it will be noted that antifriction coverings other than flocked strips can be used in the present invention, for example high density polyethylene (PED) or crosslinked polyethylene (PEX) or another slippery plastic available in strip form.

A method according to the invention for manufacturing a profile section as defined hereinabove involves multi-shot injection overmolding of said thermoplastic materials of different hardnesses in a single multi-shot injection mold of the rotary type having fixed parts and moving parts, in contact with one or more strip/s intended to form said at least one antifriction covering and/or embellishment film, the or each strip being held in position during each injection in such a way that it is pressed into intimate contact with the or each material injected in order to cover continuously:

in said scenario (i): not only said sealing longitudinal face or said visible longitudinal face but also at least one of said corresponding sealing or visible edge faces by being intimately bonded thereto as a result of this overmolding alone, or in said scenario (ii): both this sealing longitudinal face and this visible longitudinal face and optionally also at least one of said corresponding sealing and visible edge faces by being intimately bonded thereto as a result of this overmolding alone.

It will be noted that it is during injection under suitable pressure and temperature conditions that cohesion is achieved between, on the one hand, the antifriction strip/s and/or the embellishment strip/s and, on the other hand, the thermoplastic material injected into contact therewith.

It will also be noted that one of the benefits of the profile section thus obtained stems from the fact that it is produced in a single tooling workstation consisting of the multi-shot injection mold and according to several sequences detailed hereinafter.

It will further be noted that, in accordance with this scenario (ii), a profile section according to the invention may, on completion of the multi-shot injection-molding process, simultaneously incorporate one or more antifriction covering/s and one or more embellishment film/s, by the joint placement into the mold of the or each sealing strip and of the or each embellishment strip, this being independent of the aforementioned covering of said edge faces.

For manufacturing a seal by way of profile section comprising a fixing portion made completely or in part from at least one rigid material which is intended to be mounted on a support of the vehicle and which has said visible face, and a sealing portion made from at least one flexible material and which is connected to the fixing portion and has said sealing face, the profile section comprising the covering/s of flock type on the sealing portion and/or the film for example of glossy or chromed type on the fixing portion, the multi-shot injection molding method according to the invention may comprise sequential injections into distinct cavities of said mold of said at least one rigid material into at least one first cavity followed by said at least one flexible material into at least one second cavity, the injection of this flexible material being performed after the mold containing said injected rigid material has been opened, a moving part rotated and the mold closed.

According to a first exemplary embodiment of the invention, this method for the manufacture of said seal involves the following successive steps for obtaining both the covering and the film respectively on these sealing and fixing portions:

a) the installation of an embellishment strip intended to form this film at a first location in said mold,
b) the injection directly onto this embellishment strip of said at least one rigid material intended to form a clamping core that clamps the fixing portion to said support,
c) the installation of an antifriction strip intended to form this covering at a second location of said fixed part of the mold, followed by
d) injection directly onto this antifriction strip of said at least one flexible material in order to obtain said sealing portion formed as one piece with said fixing portion.

It will be noted that the covering thus covers this/these flexible material/s on the sealing portion, and that this film covers this/these rigid material/s on the fixing portion.

According to a second exemplary embodiment of the invention, this method for the manufacture of said seal involves the following successive steps for obtaining both said covering and said film respectively on these sealing and fixing portions:

a) the injection of said at least one rigid material intended to form a clamping core for clamping the fixing portion to said support,
b) the installation, at a first and second location of said mold, of an antifriction strip and of an embellishment strip which are respectively intended to form the covering and the film, followed by
c) the injection directly onto this antifriction strip and onto this embellishment strip of said at least one flexible material to obtain the sealing and fixing portions formed as a single piece and respectively bearing this covering and this film.

It will be noted that the covering and the film thus both cover this/these flexible material/s both on the sealing portion and on the fixing portion.

According to another feature of the invention, this method of manufacturing the seal may comprise suction of said strip/s intended to form said covering and/or said film at the time of injection, via a plurality of suction channels formed through said mold and opening respectively onto said sealing face and/or onto said visible face in order to hold the or each strip in position in the mold.

Advantageously, this method may further optionally comprise positioning at least one protective tape made of microporous material in the mold, the or each tape receiving the antifriction strip intended to form the covering and/or the embellishment strip intended to form the film and being able to prevent the suction from marking this strip.

BRIEF DESCRIPTION OF THE DRAWINGS

Other features, advantages and details of the present invention will become apparent from reading the following description of a number of exemplary embodiments of the invention which are given by way of nonlimiting illustration, said description being given with reference to the attached drawings in which:

FIG. 5 is a partial schematic view in longitudinal section of a profile section of the prior art, in two planes of section which are respectively perpendicular to two sealing and visible longitudinal faces of the profile section which are covered with an antifriction covering and with an embellishment film, FIG. 6 is a partial schematic view in longitudinal section of a profile section according to the invention of the seal or trim molding type, which shows an example of the covering of the end edge faces of the profile section with said covering and with said film, along the same planes of section for example embodied by planes VIa-VIa and VIb-VIb of FIG. 4, FIG. 7 is a photograph showing, in perspective, a wiping gasket of the prior art, the covering of the sealing face with an antifriction covering of which is as illustrated in FIG. 5, FIG. 8 is a photograph showing in perspective a wiping gasket according to the invention, the covering of the sealing face with an antifriction covering, including end edge faces of which, is as illustrated in FIG. 6.

DETAILED DESCRIPTION

In what follows, the qualifiers "axially inner" and "axially outer" will be used in the usual way to denote the position of a profile section element towards the inside and towards the outside, respectively, in the axial direction Y of the width of the vehicle (this transverse horizontal direction Y being, by definition, perpendicular to the XZ plane defined by the longitudinal horizontal direction X and vertical direction Z). In order to visualize these directions X, Y and Z, reference may be made to FIGS. 1, 4 and 6.

Figure 1:
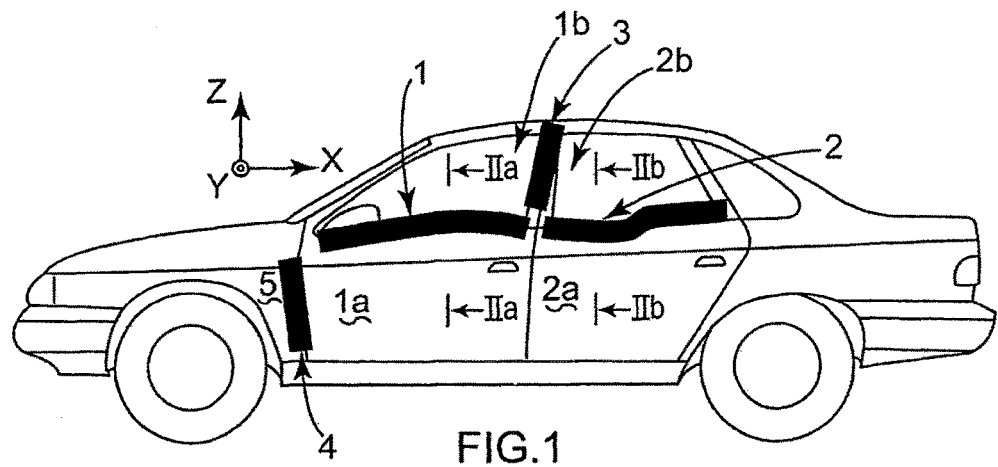
FIG. 1 is a side view of a motor vehicle illustrating examples of zones of this vehicle that may be fitted with profile sections according to the invention, particularly forming seals.

As illustrated in FIG. 1, a profile section according to the invention may form a trim molding or a seal at various locations 1, 2, 3 and/or 4 on the bodywork of a motor vehicle, for example, in the case of a seal, to provide, via an antifriction covering, sealed contact between a bodywork support and another element of the vehicle such as a deadlight or drop glass for example. Zones 1 and 2 each show a profile section constituting an inner or outer wiping gasket that provides sealing between a door panel 1a, 2a and a drop glass 1b, 2b, while zone 3 shows what is known as a "frame" seal between the frame of the adjacent door and the side of the bodyshell, and zone 4 shows a vertical seal providing sealing between the front edge of each front side door 1a and the adjacent wing or fender 5 of the vehicle. However, it will be noted that a profile section according to the invention could be used in locations other than those illustrated in FIG. 1.

Figure 2:
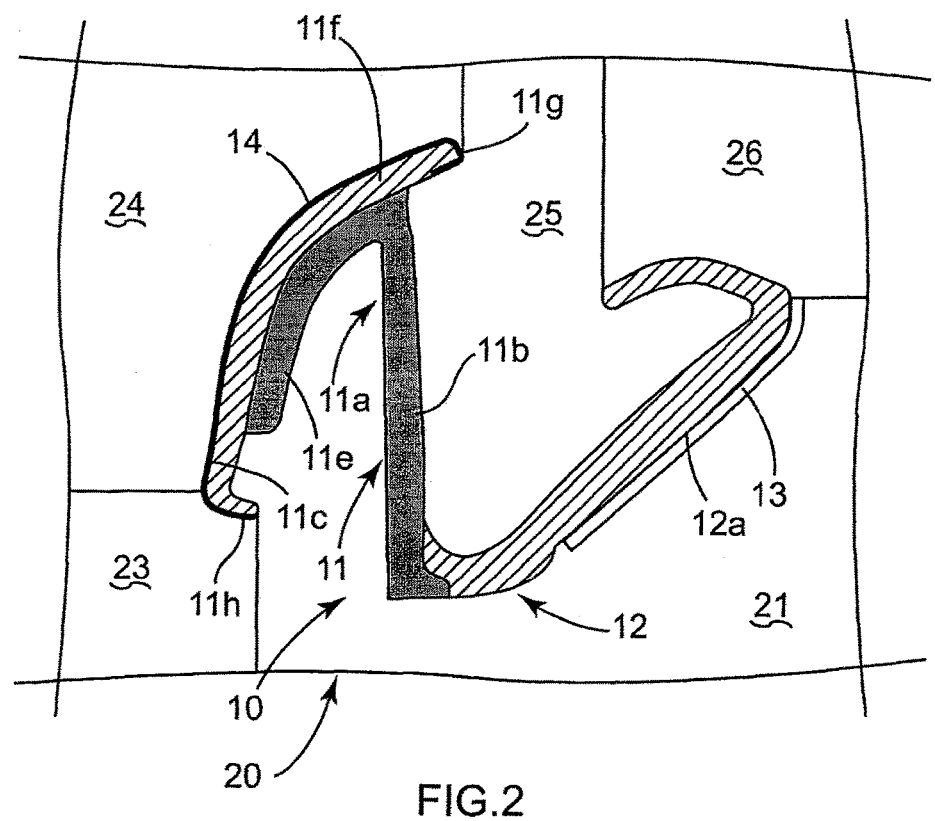
FIG. 2 is a view in transverse section of a two-shot injection molding mold containing a seal along the plane of section IIa-IIa or IIb-IIb of FIG. 1, this seal forming a window wiping gasket according to said second example of the invention, and having both said covering and said film.
Figure 3:
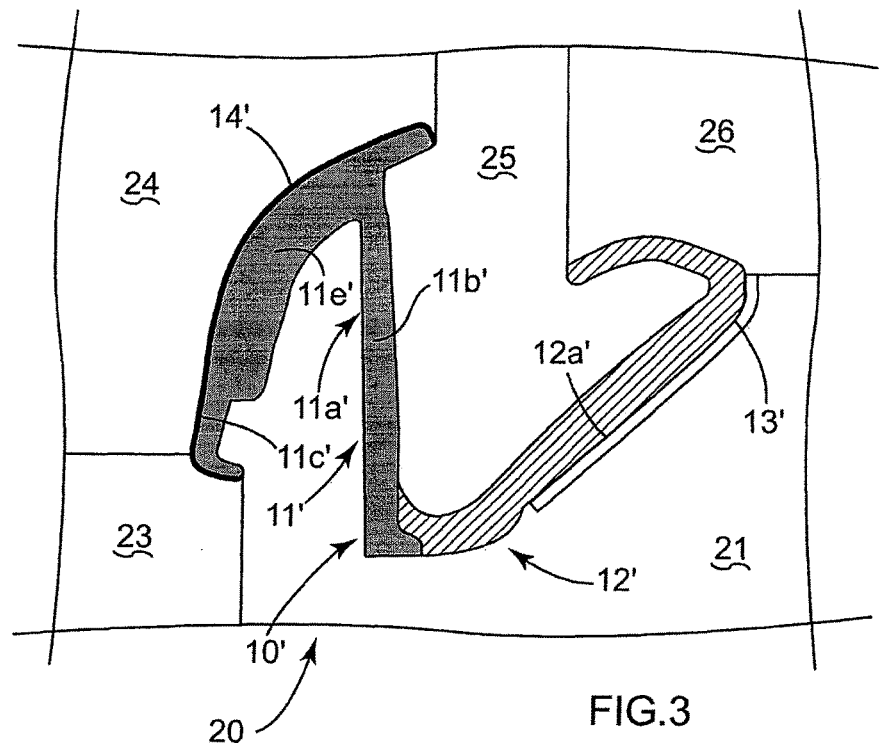
FIG. 3 is a view in transverse section of this mold containing a seal forming a window wiping gasket according to said first example of the invention and having both this covering and this film.
Figure 4:
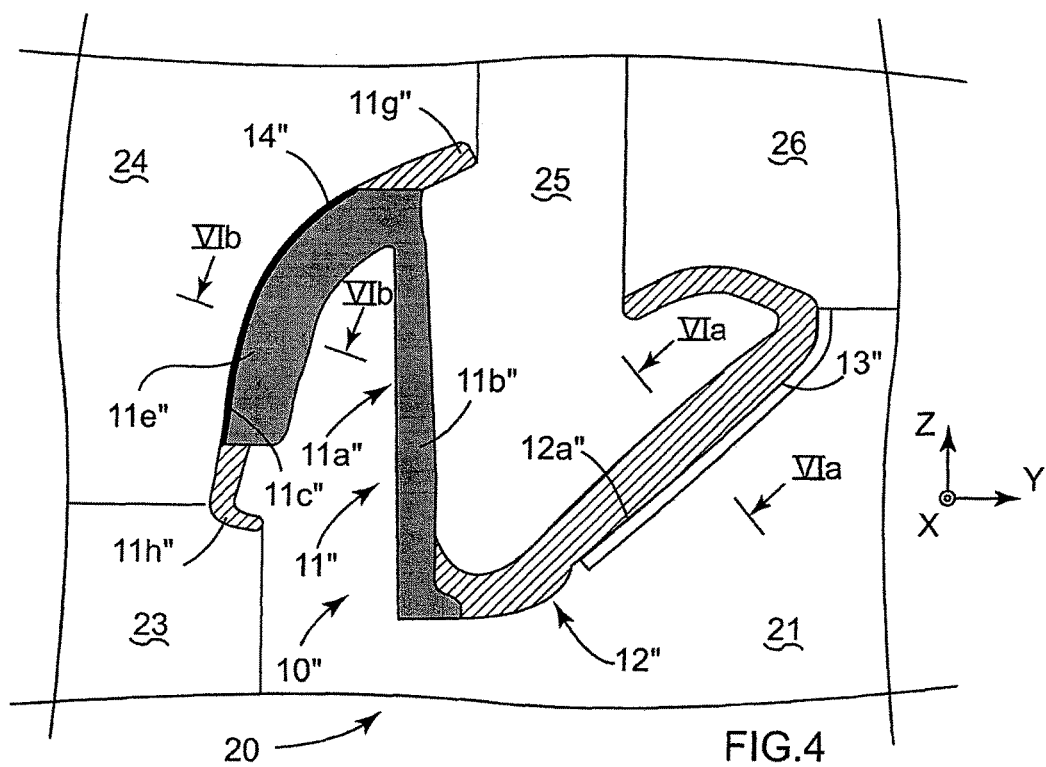
FIG. 4 is a view in transverse section of this mold containing a seal forming a wiping gasket according to an alternative form of FIG. 3 likewise corresponding to said first example of the invention and having both this covering and this film.

FIGS. 2 to 4 illustrate three examples of the two-shot injection overmolding of a seal 10, 10', 10" according to the invention, for example a window wiping gasket like those corresponding to zones 1 and 2 in FIG. 1. Each weatherstrip 10, 10', 10" comprises a fixing portion 11, 11', 11" for fixing to a bodywork support which has a rigid core 11a, 11a', 11a" forming a clamp intended to grip onto this support, and a flexible sealing portion 12, 12', 12" providing sealing between this support and the drop glass 1b, 2b and which is connected to the fixing portion 11, 11', 11" in the manner of an articulation and consists in this example of a sealing lip which in transverse section makes substantially a V shape with the adjacent branch 11b, 11b', 11b" of the rigid core 11a, 11a', 11a".

According to these preferred examples of the invention, each seal 10, 10', 10" incorporates both:

an antifriction covering 13, 13', 13" formed by overmolding which intimately covers not only the sealing longitudinal face 12a, 12a' 12a" of the back of the sealing lip 12, 12', 12" but also the two end sealing edge faces 12b (i.e. in the transverse direction Y, see FIG. 6 and also the photo of FIG. 8) of this lip 12, 12', 12"; and an embellishment film 14, 14', 14" also formed by overmolding and which intimately covers not only the visible longitudinal face 11c, 11c', 11c" of the back of the fixing portion 11, 11', 11", but also the two end visible edge faces 11d (likewise in the direction Y, see FIG. 6) of the other branch 11e, 11e', 11e" of this fixing portion 11, 11', 11" defining this visible face 11c, 11c', 11c".

In contrast with that, FIG. 5 shows that a seal 110 according to the prior art, such as a wiping gasket, usually has its antifriction covering 113 only on its sealing longitudinal face 112a without this covering 113 covering the edge faces 112b of its sealing portion 112, and/or has its embellishment film 114 only on its visible longitudinal face 111c without this film 114 covering the edge faces 111d of its fixing portion 111.

More specifically and as illustrated in FIG. 2, both the covering 13 and the film 14 of the weatherstrip 10 are applied to at least one flexible material constituting the sealing lip 12 and an external coating 11f of the rigid branch 11e of the core 11a forming a clamp (for example on one and the same material in the case of two-shot injection molding, it being emphasized that this lip 12 and this coating 11f could be made of two different flexible materials). As can be seen in FIG. 2, the antifriction covering 13 covers the sealing lip 12 over most of its oblique profile terminating just short of the bent-over end of this lip 12. As for the embellishment film 14, that in this example covers not only the visible longitudinal face of the coating of branch 11e and the two end edge faces 11d thereof but also the longitudinal edges 11g and 11h of this coating 11f. It will be noted that this embellishment film 14 could cover the fixing portion 11 of the seal 10 differently while still remaining within the scope of the invention.

The wiping gasket 10' of FIG. 3 differs from that of FIG. 2 only in that the branch 11e' of the fixing portion 11' which is furthest from the sealing portion 12' is not provided with flexible coating material, being covered directly with the embellishment film 14' which extends in a similar way to the film 14 of FIG. 2. In other words, this fixing portion 11' is formed entirely of the rigid core that forms a clamp 11a' and incorporates the film 14.

The wiping gasket 10" in FIG. 4 differs from that of FIG. 3 only in that the branch 11e" of the fixing portion 11" which is furthest from the sealing portion 12" has its two, upper and lower, longitudinal edges formed of short lips 11g" and 11h" which extend the visible longitudinal face 11c" of this branch 11e" (which is not provided with flexible coating material just like the branch 11e').

Figure 9:
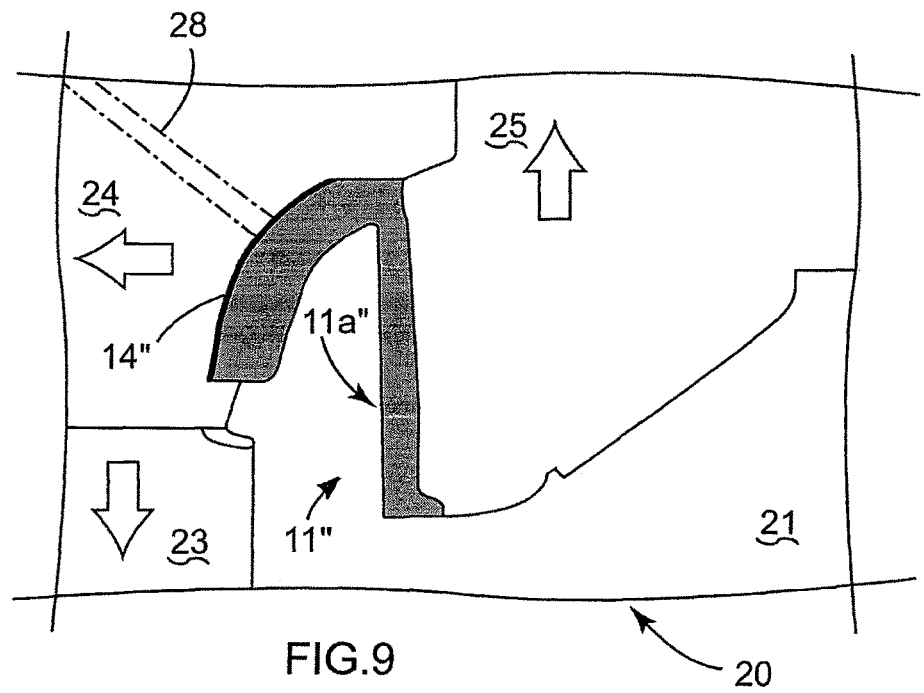
FIG. 9 is a schematic view in transverse section of said two-shot injection mold illustrating the kinematics of various parts of this mold in an intermediate configuration after the fixing portion of the seal of FIG. 4 has been obtained.
Figure 10:
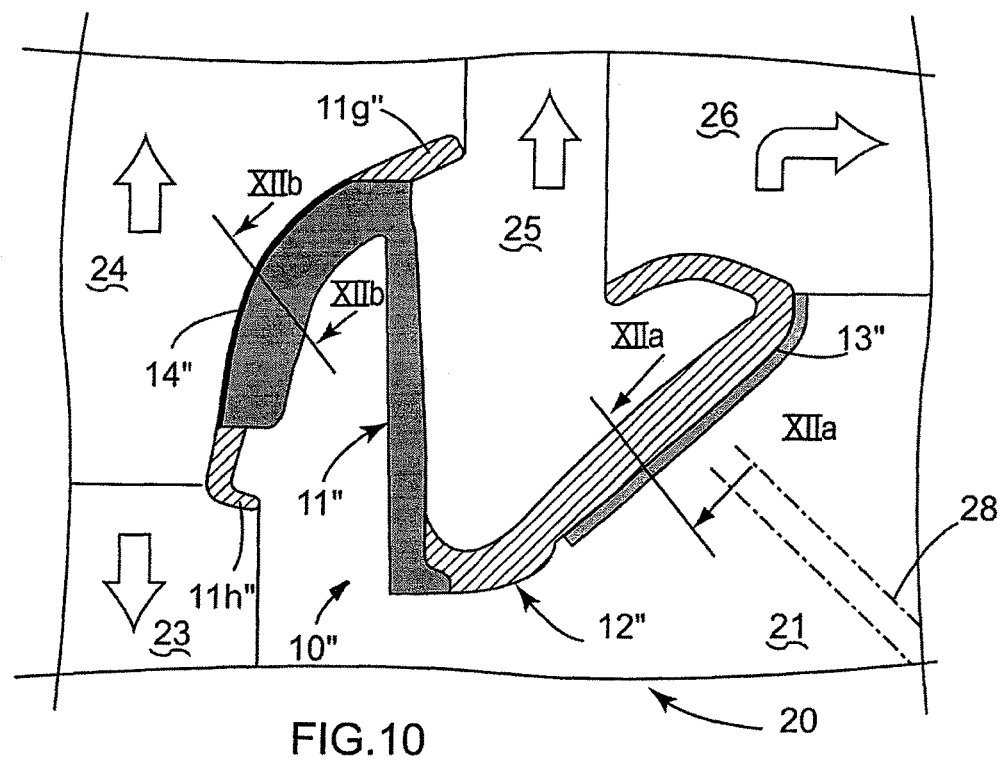
FIG. 10 is a schematic view in transverse section of the mold of FIG. 9, illustrating the overall kinematics of all of its parts and of the means for retaining in this mold the strips that are intended to form the covering and the film in order to obtain the fixing and sealing portions of the seal of FIG. 4.
Figure 11:
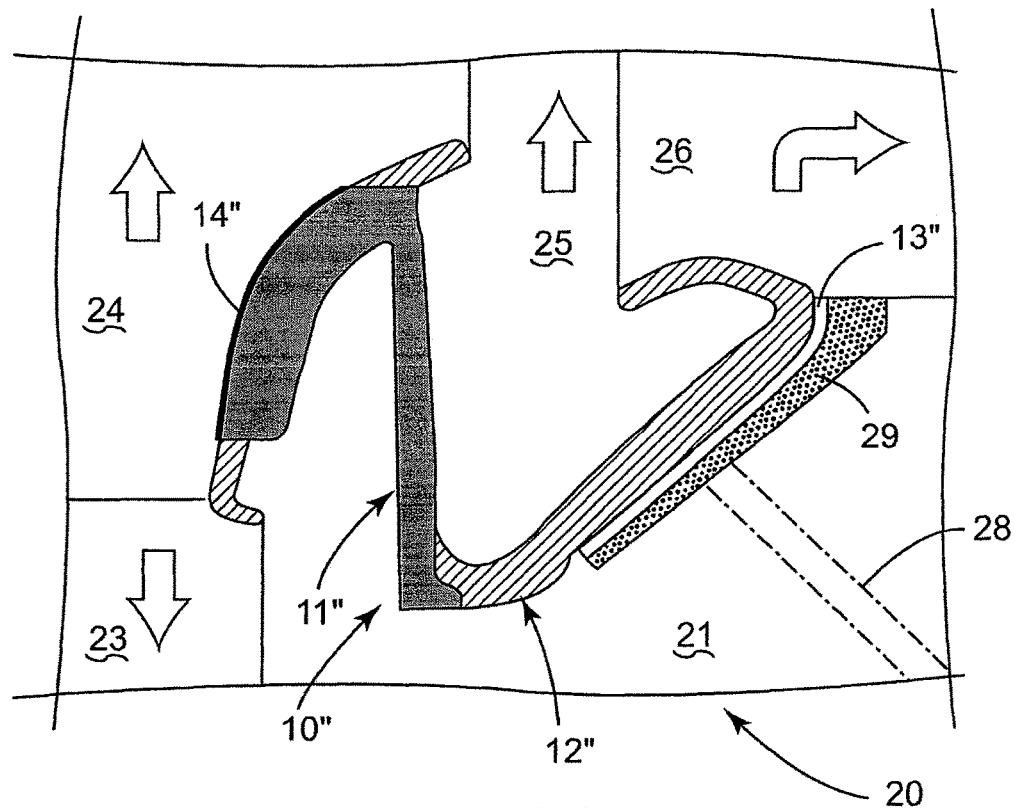
FIG. 11 is a schematic view in transverse section of a two-shot injection mold according to an alternative form of FIG. 10, showing other means for retaining in the mold the strip that is intended to form the covering, for this same seal of FIG. 4.
Figure 12:
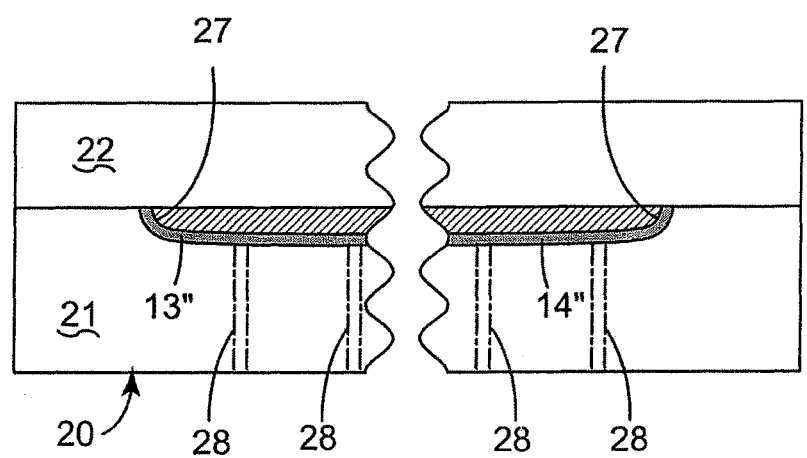
FIG. 12 is a partial schematic view in longitudinal section of a two-shot injection mold according to the invention that can be used to obtain all of the seals illustrated in FIGS. 2 to 4, for example viewed on planes of section XIIa-XIIa and XIIb-XIIb of FIG. 10, which, in the same manner as FIG. 6, shows the internal geometry of the mold that allows the end edge faces of the profile section to be covered with said covering and with said film at obtuse angles formed by these edge faces.
Figure 13:
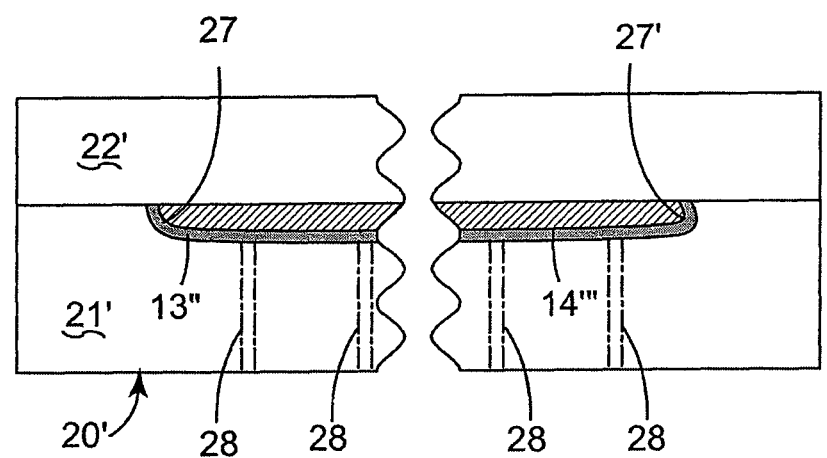
FIG. 13 is a partial schematic view in longitudinal section of another two-shot injection mold according to the invention, in accordance with an alternative form of FIG. 12 showing its internal geometry for covering, with said covering and with said film, a sealing edge face at an obtuse angle and a visible edge face at an acute angle, and FIGS. 14 to 17 respectively are views in transverse section of four profile sections forming window wiping gaskets according to alternative forms of FIGS. 2 to 4, the fixing portions of which are fixed to the corresponding supports by clips (FIGS. 14, 15 and 17) or by catching members of the barbed hook type (FIG. 16) and which each have one or more antifriction coverings and an embellishment film with the exception of the profile section of FIG. 15 which has only one covering of this type.

FIGS. 9 to 11 illustrate one example of the kinematics of the two-shot injection mold 20 that can be used to obtain this seal 10" of FIG. 4, this mold 20 essentially comprising a fixed part 21 in its bottom and a moving part 22 (see FIG. 12) comprising a plurality of segments 23, 24, 25, 26 of which the respective movements of opening in relation to this fixed part 21 are identified by arrows. In order to achieve the covering of the respective sealing 12b and visible 11d end edge faces of the profile section 10" visible in FIG. 6, the mold 20 advantageously has radii of curvature 27 which are considered to cause the covering 13" and/or the film 14" that covers/cover these edge faces 12b, 11d to "turnover" in a rounded (substantially "[" shaped) fashion as illustrated in FIG. 12 in the case of flared radii of curvature 27 forming substantially an obtuse angle and, in FIG. 13, in the case of a radius of curvature 27' in the form of a backdraft making substantially an acute angle in the mold 20' the fixed 21' and moving 22' parts of which are depicted (in FIG. 13, the backdraft radius 27' that the embellishment film 14"' continuously follows is illustrated for the visible edge face 11d alone but it will be understood that this radius 27' could also be used for the sealing edge face 12b).

The antifriction and/or embellishment strips respectively intended to form this covering 13" and/or this film 14" are either of fixed width paid out from a reel, or having complex shapes, in which case they can be cut from a reel and then thermoformed, or alternatively cut from a flat sheet using a punch. These strips may also consist of a sheet that projects from the mold 20, that is then trimmed after molding to suit the finished product.

These antifriction and/or embellishment strips are positioned in the mold 20 by an operator or a robot and may be held in place by suction (i.e. vacuum), by electromagnetism or by an adhesive, for example. If they are held in place by suction then use may be made of the channels 28 formed in the mold 20 (see FIGS. 10 to 13) optionally interposing a protective tape 29 made of a material of microporous type in order to prevent the opening edge of each suction channel 28 from marking these strips. FIGS. 10 and 11 show these suction channels 28, it being emphasized that the embellishing film 14" has already been secured to the rigid material.

In this exemplary embodiment of FIGS. 9 to 11 which refers to the obtaining of the seal 10" of FIG. 4, to start off with the embellishing strip intended to form the embellishing film 14" on the fixing portion of the seal 10" is installed in the mold 20 then the rigid material intended to form the core 11a" is injected over this strip. The antifriction strip intended to form the antifriction covering 13" is then placed in the bottom of the fixed part 21 of the mold 20 then the flexible material (e.g. TPE-based material) intended to form the sealing portion 12" is injected, part of this coming into contact with this antifriction strip and another part extending the rigid core 11a" at its longitudinal edges, forming there the lips 11g" and 11h" (visible in FIG. 10).

It will be noted that the same approach may be followed to obtain the seal 10' according to the variant of FIG. 3, except that the flexible material injected forms only the sealing portion 12'.

To obtain the seal 10 of FIG. 2, to start off with the rigid material intended to form the core 11a is injected. Next, the two, antifriction and embellishing strips intended respectively to form the antifriction covering 13 and the embellishing film 14 are placed in the mold 20 then the flexible material (e.g. TPE-based material) is injected firstly in contact with the antifriction strip in order there to form the sealing portion 12 and, secondly, in contact with the embellishment strip in order there to form the coating 11f of the branch 11e of the fixing portion 11.

The profile section 110 forming a window wiping gasket 1b illustrated in FIG. 14 comprises a fixing portion 111 which, instead of the rigid clamp-forming gripping core 11a, 11a', 11a" of the profile sections 10, 10', 10" of FIGS. 2 to 4 has a rigid zone equipped with an orifice 111a that accepts pins or clips 130 for fixing to the bodywork support 140 through which they pass in a spaced-apart manner. This profile section 110 has an embellishment film 114 according to the invention which by overmolding covers a flexible lip 114 which extends the fixing portion 111 on the opposite side to the clips 130 and is mounted against a rim of the support 140. As for the sealing portion of the profile section 110, it comprises a flexible lip 112 which runs substantially parallel to the lip 115 and is covered by overmolding with an antifriction covering 113 according to the invention.

The profile section 210 that forms a window wiping gasket 1b illustrated in FIG. 15 comprises a fixing portion 211 formed of a rigid leg through which there pass, in a spaced-apart manner, clips 230 for fixing to the bodywork support 240. As for the sealing portion of this profile section 210, it is formed of a flexible lip 212 which in the stressed state extends the leg 211 substantially in the same direction and is covered by overmolding with an antifriction covering 213 according to the invention.

The profile section 310 forming a window wiping gasket illustrated in FIG. 17 comprises a fixing portion 311 also formed of a rigid leg through which there pass in a spaced apart manner clips 330 for fixing to the bodywork support 340. This profile section 310 has embellishment film 314 according to the invention covering by overmolding a rigid section 315 which laterally extends the end of the leg 311 away from the clips 330 and is mounted against a rim of the support 340. As for the sealing portion of this profile section 310, it is formed of a rigid first lip 312a which extends the section 315 on the other side of the leg 311 substantially in the same direction and is covered by overmolding with an antifriction covering 313a according to the invention, and of a flexible second lip 312b which runs parallel to the first lip 312a and is covered by overmolding with another antifriction covering 313b according to the invention.

The profile section 410 forming a window wiping gasket 1b illustrated in FIG. 16 comprises a fixing portion 411 also formed of a leg which is rigid but which, instead of having clips for fixing to the bodywork support 440 passing through it has a longitudinal end 430 in the shape of a spike of a barbed hook which allows the profile section 410 to catch inside a U-shaped portion of this support 440. This profile section 410 has an embellishment film 414 according to the invention covering by overmolding the dorsal face of a flexible lip 412a which laterally extends the end of the leg 411 opposite to the attachment end 430 and is mounted against a rim of the support 440. As for the sealing portion of this profile section 410, it is formed of this flexible lip 412a which is covered on its other face by overmolding with an antifriction covering 413a according to the invention and of another flexible lip 412b which runs parallel to the lip 412a and is covered by overmolding with another antifriction covering 413b according to the invention. Thus, this profile section 410 is F-shaped in overall cross section, with the long bar at the top formed of the lip 412a, and the short bar in the middle formed by the lip 412b and the leg having the barbed-hook catching end 430 near its base.

The invention claimed is:

1. A profile section molded by multi-shot injection molding of thermoplastic materials of different hardnesses forming a seal or trim molding for automotive vehicle bodywork, the profile section extending along a longitudinal direction X and comprising:
   at least one antifriction covering intimately bonded to a longitudinal sealing face of the profile section and intended to provide sealed contact with a mobile element of the vehicle, said longitudinal sealing face terminating substantially at right angles by two sealing transverse edge faces located at the respective ends of the profile section and extending in a transverse direction Y perpendicular to the longitudinal direction X, and/or
   at least one embellishing film intimately bonded to a visible longitudinal face of the profile section mounted on the vehicle and intended to heighten the appearance of this visible face, said visible face being distinct from said sealing face and terminating substantially at right angles by two visible transverse edge faces located at the respective ends of the profile section, and extending in a transverse direction Y perpendicular to the longitudinal direction X, wherein said materials are overmolded:

(i) either on said at least one antifriction covering or on said at least one embellishing film, which covering/s or which film/s is/are also intimately bonded continuously by this overmolding to at least one of said sealing edge faces or to at least one of said visible edge faces, respectively, (ii) or both to said at least one antifriction covering and to said at least one embellishing film, which at least one antifriction covering/s and which at least one embellishing film/s are optionally also intimately bonded continuously by this overmolding to at least one of said longitudinal sealing edge faces and to at least one of said visible edge faces, respectively.

2. The profile section as claimed in claim 1, characterized in that said at least one antifriction covering and/or at least one embellishing film has/have, when a longitudinal section is viewed in a section plane which is substantially perpendicular to said longitudinal sealing face and/or to said visible face, respectively, a flat or curved median portion that hugs the contour of the longitudinal sealing face and extends continuously via a rounded portion at least at one of said sealing and/or visible transverse edge faces so that this at least one antifriction covering and/or this at least one embellishing film has/have substantially in this plane of section the shape of a "∫" at said or each sealing and/or visible transverse edge face that it/they covers/cover.

3. The profile section as claimed in claim 2, wherein said at least one antifriction covering and/or said at least one embellishing film substantially has/have this "∫" shape at each of said two sealing and/or visible transverse edge faces, each sealing edge face and/or each visible transverse edge face making an acute or obtuse angle with said sealing face and/or said visible face, respectively.

4. The profile section as claimed in claim 1, wherein the profile section forms said seal, comprising a fixing portion made completely or in part from at least one rigid material which is intended to be mounted on a support of the vehicle and which has said visible face, and a sealing portion made from at least one flexible material and which is connected to the fixing portion and has said longitudinal sealing face, the profile section comprising said at least one antifriction covering/s on said sealing portion and/or said at least one embellishing film/s on said fixing portion.

5. The profile section as claimed in claim 4, wherein the profile section comprises both said at least one antifriction covering/s and said at least one embellishing film/s respectively on said longitudinal sealing and visible faces which define dorsal faces of said sealing and fixing portions and which are situated on opposite sides from one another in the transverse direction of the profile section.

6. The profile section as claimed in claim 5, wherein said at least one antifriction covering/s and said at least one embellishing film/s both cover said at least one flexible material respectively on said sealing portion and on said fixing portion, the latter comprising at least one portion composed of a rigid material which is not covered with said at least one embellishing film and a partial coating composed of a flexible material which is provided on said rigid material and which defines said visible face covered with said at least one embellishing film.

7. The profile section as claimed in claim 5, wherein said at least one antifriction covering covers said at least one flexible material over said sealing portion and in that said at least one embellishing film covers said at least one rigid material over said fixing portion, the latter comprising said at least one rigid material intended to be mounted in contact with said support and, optionally also, at least one lip made from said at least one flexible material and extending said visible face and which is not provided with this at least one embellishing film.

8. The profile section as claimed in claim 4, wherein said fixing portion is configured to form a core for gripping said support in the manner of a clamp.

9. The profile section as claimed in claim 4, wherein said fixing portion is configured to be mounted by clipping on said support via a plurality of pins or clips which in a spaced-apart manner pass through this fixing portion and are intended to pass through an orifice in this support.

10. The profile section as claimed in claim 4, wherein said fixing portion terminates in a leg provided with spikes having the shape of a barbed end of a hook, so that it catches in a U-section portion of said support.

11. The profile section as claimed in claim 4, wherein the profile section forms, by way of a seal, an inner or outer wiping gasket for a vehicle drop glass, in which said fixing portion is made from said at least one rigid material and said sealing portion comprises at least one sealing lip connected to said fixing portion.

12. A profile section molded by multi-shot injection molding of thermoplastic materials of different hardnesses forming a seal or trim molding for automotive vehicle bodywork, the profile section extending along a longitudinal direction X and comprising:

at least one antifriction covering intimately bonded to a longitudinal sealing face of the profile section and intended to provide sealed contact with a mobile element of the vehicle, said longitudinal sealing face terminating substantially at right angles by two sealing transverse edge faces located at the respective ends of the profile section and extending in a transverse direction Y perpendicular to the longitudinal direction X, and at least one embellishing film intimately bonded to a visible longitudinal face of the profile section mounted on the vehicle and intended to heighten the appearance of this visible face, said visible face being distinct from said sealing face and terminating substantially at right angles by two visible transverse edge faces located at the respective ends of the profile section, and extending in a transverse direction Y perpendicular to the longitudinal axis direction, wherein said materials are overmolded:

(i) either on said at least one antifriction covering or on said at least one embellishing film, which covering/s or which film/s is/are also intimately bonded continuously by this overmolding to at least one of said sealing edge faces or to at least one of said visible edge faces, regtectively, (ii) or both to said at least one antifriction covering and to said at least one embellishing film, which at least one antifriction covering/s and which at least one embellishing film/s are optionally also intimately bonded continuously by this overmolding to at least one of said longitudinal sealing edge faces and to at least one of said visible edge faces, respectively.

* * * * *